US006488719B2

(12) United States Patent
Lomasney et al.

(10) Patent No.: US 6,488,719 B2
(45) Date of Patent: Dec. 3, 2002

(54) METHOD FOR CONTROLLING WET FILM THICKNESS OF CLEAR COATINGS BY MEANS OF COLOR-DISSIPATING DYE

(75) Inventors: Henry Lomasney, Leawood Kansas, MO (US); Perry Kilpatrick, Kansas City, MO (US); Shirish Pandit, Kansas City, MO (US)

(73) Assignee: Inemec Company, Inc., Kansas City, MO (US)

( * ) Notice: Subject to any disclaimer, the term of this patent is extended or adjusted under 35 U.S.C. 154(b) by 0 days.

(21) Appl. No.: 09/852,152

(22) Filed: May 10, 2001

(65) Prior Publication Data

US 2002/0025371 A1 Feb. 28, 2002

Related U.S. Application Data

(62) Division of application No. 09/469,328, filed on Dec. 22, 1999, now Pat. No. 6,261,631
(60) Provisional application No. 60/113,498, filed on Dec. 22, 1998.

(51) Int. Cl.$^7$ .................................................. D06P 5/13
(52) U.S. Cl. ........................................ 8/403; 106/31.32
(58) Field of Search ............... 427/9; 8/403; 106/31.01, 106/31.32

(56) References Cited

U.S. PATENT DOCUMENTS

| | | | |
|---|---|---|---|
| 2,320,842 A | 6/1943 | Arnold et al. | |
| 2,979,420 A | 4/1961 | Harper | |
| 3,372,052 A | 3/1968 | Polniaszek | |
| 3,930,063 A | 12/1975 | Miller et al. ................. | 427/54 |
| 3,975,554 A | 8/1976 | Kummins et al. ............. | 427/8 |
| 4,505,944 A | * 3/1985 | Turner .......................... | 106/19 |
| 5,071,440 A | 12/1991 | Hines et al. .................. | 8/403 |
| 5,108,460 A | 4/1992 | Hines et al. .................. | 8/403 |
| 5,232,494 A | 8/1993 | Miller et al. | |
| 5,326,388 A | 7/1994 | Miller et al. | |
| 5,548,010 A | 8/1996 | Franer ........................ | 524/198 |
| 5,873,909 A | * 2/1999 | Brodmann et al. ............ | 8/403 |

FOREIGN PATENT DOCUMENTS

FR        1467175        12/1966

OTHER PUBLICATIONS

BASF Technical Information Bulletin, Entitled "Color Basonyl.RTM.Dyes", Aug. 1987, P. 5, TI/P280.
BASF Corp. Technical Information Bulletin, Entitled "Color Flexo Dyes", Dec. 1986, TI/P2536, pp. 2, 6–9.
Warner–Jenkinson Company, Product Bulletin Entitled "Certified Food Colors", Sep. 1990, pp. 7, 9, 26, 29.
Warner–Jenkinson Company, Product Bulletin Entitled "Certified Food Colors", Jul. 1993, pp. 8–9, 33, 36, 37.
Warner–Jenkinson Company, Product Bulletin Entitled "All About LAKD Pigments", Oct. 1992, pp. 5,9.
BASF Corp. Technical Information Bulletin BCS 1110 Aug.,1990, Entitled "Color Basonyl.RTM.NB Dyes", P. 4 Aug. 1990.

* cited by examiner

Primary Examiner—Erma Cameron
(74) Attorney, Agent, or Firm—Blackwell Sanders Peper Martin, LLP

(57) ABSTRACT

A method for controlling uniformity of applied film thickness of clear protective coatings by means of a color-dissipatable dye additive which dissipates within a reasonable timeframe, generally from hours to a few days, leaving the applied film with no evidence of its use during the application phase. The color additives temporarily impart color to an otherwise clear coating, and subsequently dissipate over a short period of time. An embodiment of this technology includes the addition of a compatibilizer carrier solution to increase the ease of measuring the dye for addition to the clear coating.

12 Claims, 2 Drawing Sheets

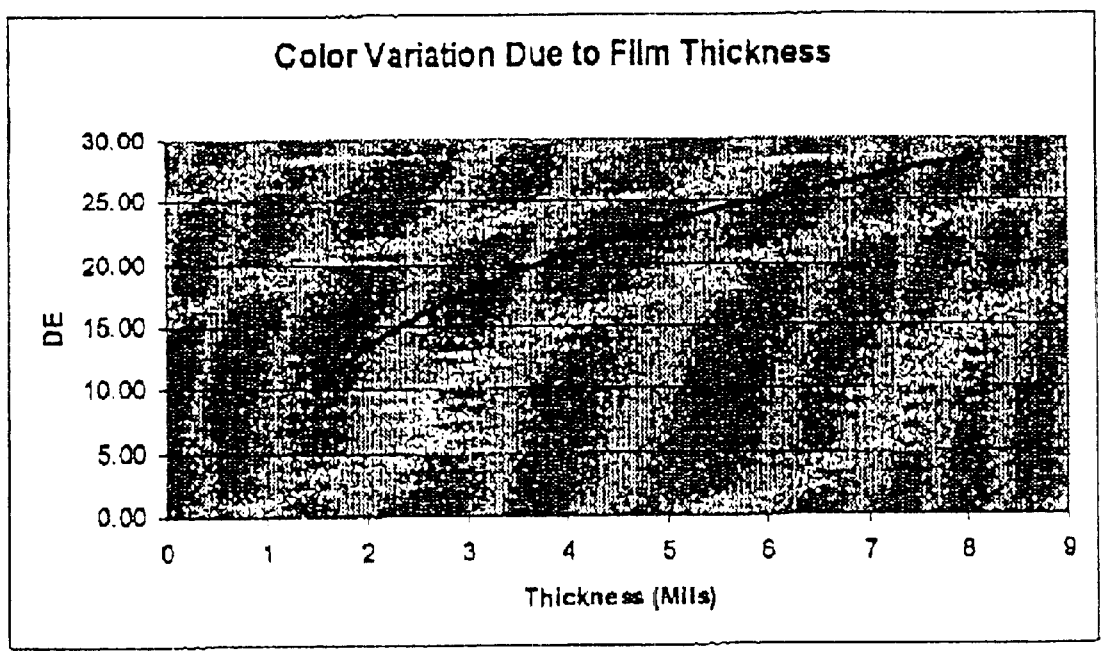
Figure I

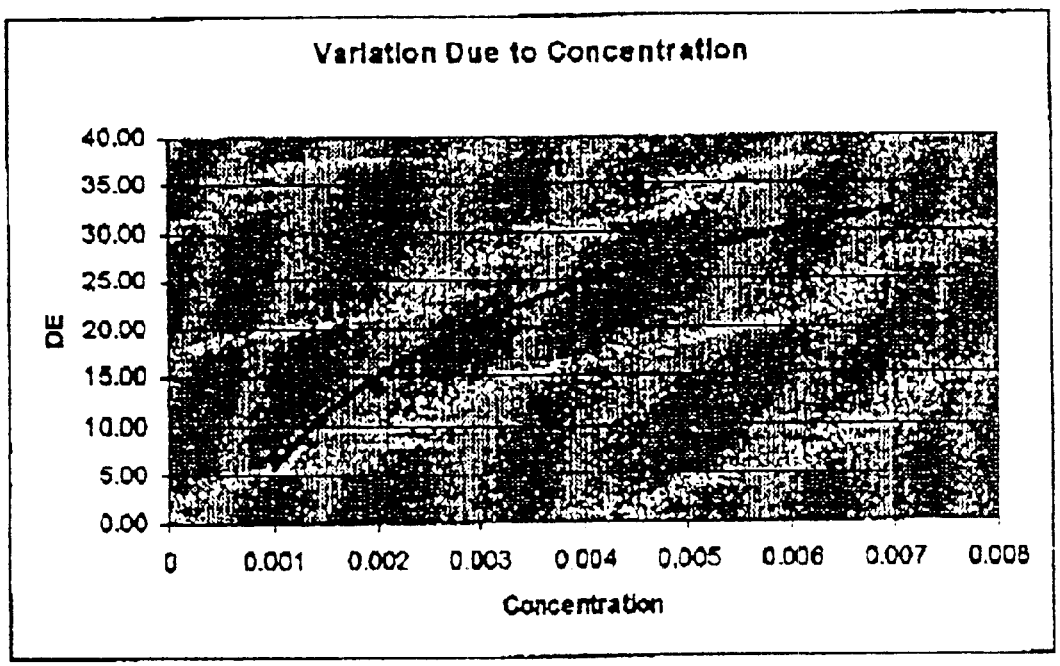
Figure II

METHOD FOR CONTROLLING WET FILM THICKNESS OF CLEAR COATINGS BY MEANS OF COLOR-DISSIPATING DYE

This is a divisional application of U.S. patent application Ser. No. 09/469,328, now U.S. Pat. No. 6,261,631, filed Dec. 22, 1999, and claims the benefit of U.S. Provisional Patent Application No. 60/113,498, filed Dec. 22, 1998.

BACKGROUND OF THE INVENTION

This invention relates to protective coatings on decorative compositions and, more specifically, for formulas that facilitate the application thereof. For convenience, the words "clear coating(s)" will be frequently used herein as a generic term for components that are essentially water-white. This invention is particularly concerned with colorants that may temporarily impart color to these otherwise clear coatings, the color dissipating over a relatively short period of time. A further aspect of the invention is a method of designing the concentration of colorant such that the opacity is minimal, thus making it possible to utilize the translucent feature to judge the film thickness.

The function of a clear coating is that, when uniformly applied, it improves the service life and protection afforded by the coating system. Modern high performance coatings are often chosen based upon their ability to maintain their color and gloss over long periods. It has been an aim of manufacturers to achieve more permanency and fastness of color to resist fading for as long as possible. Clear coatings, especially those that are resistant to UV light deterioration, have been found to be highly effective in providing a means to this goal. Clear coatings can be formulated such that they improve the color stability and gloss retention of a base coat and reduce the tendency of color pigments, associated with these base coats, to fade in sunlight. However, to be effective, they must be applied uniformly.

In the past, applying a clear coat at a uniform film thickness over a previously coated surface, especially one that has a high gloss, has been a problem. The applicator has difficulty with the control of the uniformity of wet film thickness since it is difficult to observe the amount of coating that has been applied. Such a limitation is a serious problem, since the amount of protection which the clear coating provides to the underlying base coat (a pigmented coating) is affected by the thickness of the clear coat. If the clear coat is applied at a film thickness that is less than the designed minimum, the resistance to ultra-violet (UV) light transmission through the clear coat is compromised, and the coating's function is compromised. The result is an undesirable variation in color uniformity observed after a period of time.

For the foregoing reasons, there is a need for a paint additive that allows an applicator to judge the thickness of a clear coating film that is being applied to a substrate.

SUMMARY OF THE INVENTION

Protective clear coatings can be applied over colored base coats in order to protect the pigmented base coats from deterioration by UV light. It is important that film thickness be uniform. The present invention is directed to a chemical composition that satisfies the need for a paint additive that aids the applicator in determining that the coating film is being applied at the correct film thickness and uniformity.

This discovery involves a chemical composition comprising a color-dissipatable dye that is unstable when exposed to UV light. The exposure to sunlight (either direct or diffuse) of this novel combination of clear coating and color-dissipatable dye results in the color being dissipated by photo chemical or thermal, oxidation and/or reduction. When mixed with the coating at the proper concentration, the result is a coating that provides a translucent color that has limited opacity and thus reveals thin versus thick film build. Because the colorant dissipates, the return to the "clear coating" appearance takes place within a reasonable timeframe, preferably from hours to a few days in a typical formula composition.

An embodiment of this invention is a composition comprising a color-dissipatable dye preferably one selected from a group of dyes including basonyl green, basonyl blue, pylam blue, trialmethanes; flexo yellow, diarylmethane; FD&C #2 indigotene; FD&C #2 lake; FD&C #1, FD&C #3 green, triphenylmethanes; FD&C #1 lake; FD&C #5 yellow, erythrosine lake; and FD&C #5 yellow lake.

The preferred application of this technology is realized in the form of a dissipating colorant being introduced into an otherwise clear coating, where the polymeric composition of the clear coating is selected from a group including acrylic, urethane, epoxy, or polyester. In all of these polymeric options, the product can be delivered in either waterborne, solvent, or 100% solids (i.e. solvent-free) form.

Another embodiment of this technology involves a color-dissipating coating composition that incorporates a compatibilizer carrier solution selected to increase the ease of measuring the dye for addition to the clear coating composition, to which is added a light-unstable dye. The dye mixture is further selected to facilitate the tolerance of the dye when mixed into the clear coating composition. The dye carrier is selected from a group including water, glycerin, propylene glycol, sodium benzoate, hydroxyl propyl methylcellulose, aromatic, aliphatic and oxygenated solvents.

An objective of this invention is to provide a method of making an "applicator-friendly" clear coating that exhibits a translucent coloring, said color permitting the visual detection of uniform application, said color dissipating over a relatively short period of time when exposed to one or more of the dissipation-promoting conditions of photochemical or thermal, oxidation and/or reduction, depending on the chemical composition of the dye. A second objective is to provide a practical and highly reliable mechanism for delivering a uniform protective film, which will subsequently protect a substrate from deterioration caused by weathering. A third objective is to describe the techniques to be used to obtain a composition having color sufficient to obtain the desired color contrast, such that the coating provides the performance objectives. A fourth objective is to describe techniques for incorporating the colorants into clear coating formulae that are routinely used in this service.

Another objective of this disclosure is to define the method of applying a protective coating having enough color strength that an applicator is provided with a means for easily determining where said coating has been applied, which encompasses the lifetime requirements for the color-dissipating dye component incorporated in said composition previously described, whereupon color of the light-unstable dye will have proceeded to disappear.

Another objective of this invention is to provide a method which provides a means for avoiding skips and thin spots (holidays) in a freshly applied clear coating and which also provides a means for accenting sags and runs in an applied clear coat by means of the color contrast which exists between the desired film thickness and a high film thickness associated with such sags and runs.

These and other features, aspects, and advantages of the present invention will become better understood with reference to the following description and appended claims.

BRIEF DESCRIPTION OF THE DRAWINGS

FIG. I is a chart showing the relationship between DE units and film thickness, in accordance with the present invention; and FIG. II is a chart showing the relationship between DE units and dye concentration with respect to a coating, in accordance with the present invention.

DETAILED DESCRIPTION OF THE PREFERRED EMBODIMENTS

Figure 1:
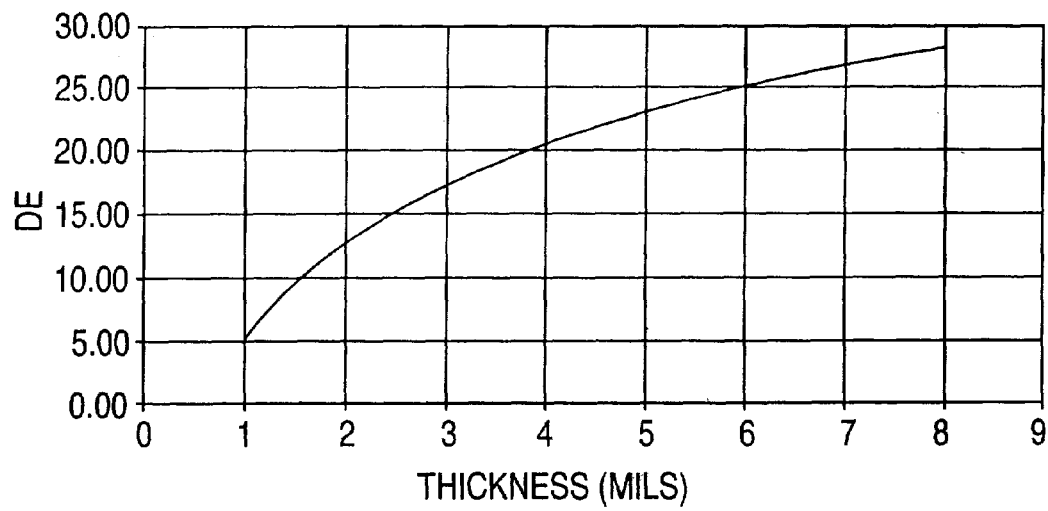

The invention is illustrated by means of the following illustrative, but non-limiting examples: Technologies are well established for producing dyes and colorants that exhibit poor light stability characteristics. Two typical dyes of this category are indigotene blue and triarylmethane green. Upon exposure to UV light, a chain-scission phenomenon occurs which causes a dissipation of the dye. This is achieved by oxidization, reduction, exposure to light, or a combination thereof.

Temporary change of color: When added to a coating material that is difficult to see, the result is a color that is reversible over a reasonable period of time. See below a formulation of a standard polyurethane acrylic composition.

REPRESENTATIVE POLYURETHANE ACRYLIC COATING

|  |  | Range |
|---|---|---|
| Component I |  |  |
| Desmophen A LS-2945 | 37.45 | 35.00–40.00 |
| Desmophen 631A-75 | 17.47 | 15.00–20.00 |
| CAB 381-0.1 (10% in MPA) | .67 | .60–.74 |
| Acronal 700L | .13 | .10–.16 |
| Tinuvin 1130 | .67 | .60–.74 |
| Tinuvin 292 | .67 | .60–.74 |
| Exxate 700 | 2.61 | 2.25–3.00 |
| n-Butyl Acetate | 10.45 | 10.00–11.00 |
| Methyl Amyl Ketone | 2.61 | 2.25–3.00 |
| Component II |  |  |
| Desmodur N-3300 | 27.60 | 25.00–30.00 |
|  | 100.00 |  |

Preferred dyes are those which are known to have relatively poor light stability. Dyes may vary as to light sensitivity; however, the light-fastness does not depend solely on the light itself, it is also governed, to a large extent, by the concentration of the dye, the thickness of the coating, the nature of the binder and the temperature of the substrate and surroundings. A critical parameter could be the reaction of the dye to oxidizing agents, reducing agents, drying time, etc. Consideration is therefore required to equate the constituents and the amount best suited to the type of dye and characteristics desired in the dissipating color application thereof.

Generally it is preferred that the dye color dissipate in hours or days. Also relevant to the selection of the dye is the reaction of the dye with the coating constituents, pH factor, solubility, length of pot life, storage expectations and performance of paint during application. The following Example A describes the dye/colorant composition used in the polyurethane coating above.

EXAMPLE A

Basonyl, TRM, Violet, Manufactured by BASF Corp., 36 Riverside Ave., Rensselaer, N.Y.

| Composition | Amount to 100 parts paint by weight (as measured) | Range |
|---|---|---|
| 5.30 Basonyl Violet 610 | .0010 | .0009–.0011 |
| 63.13 Methyl Amyl Ketone | .0119 | .0115–.0120 |
| 31.57 Isopropyl Alcohol | .0060 | .0055–.0065 |

In actual test conditions, the compositions and the added dye are uniformly mixed and are coated on a specially prepared white paperboard substrate, such as that made by Leneta Co. A metal-bar coater, such as that manufactured by P.G.&T. Co., is used to apply the paint (drawndown), a uniform coating at wet film thicknesses of 1.5 mils, 2 mils, 4 mils, 6 mils, 8 mils. The thus coated paperboard is cured in absence of light. Color strength can be measured, followed by exposure to exterior ambient sunlight and the color difference is measured using a spectrophotometer. The rate of color dissipation can be reported. The end point is defined as the condition when the dye is no longer observable on the paint cards when compared to a control. The control consists of a paint card of the type listed above, overcoated with the representative coating without the addition of the dye.

TABLE I

COLOR VARIATION DUE TO FILM THICKNESS AT CONSTANT CONCENTRATION

| Mils. | 1.5 | 2.0 | 4.0 | 6.0 | 8.0 |
|---|---|---|---|---|---|
| *DE | 10.04 | 13.80 | 20.69 | 24.98 | 28.45 |

*Average of 3 films, 6 readings (FMCII Ill. D65)

The data presented in Table I and FIG. I was developed using Datacolor, Intl., spectrophotometer Model SF-600CT using sphere geometry. "DE" is defined as the change of energy which is measured using FMCII under illuminant 065 using a 10° standard observer. It is generally recognized and accepted that the average human eye can readily detect a color difference of two "DE" units. This mechanism shows that the color difference in the low film thickness range of 1 mil to 2 mils, a variation of one-half mil is detectable at this specific concentration. In FIG. I, the higher film thickness range is less sensitive. However, an observer of normal visual skills can readily differentiate between a 4 mil thick film and a 6 mil thick film. Therefore, the average human observer using the naked-eye could observe variations as small as half a mil at thicknesses of 1 mil to 2 mils and a variation of 1 mil at thicknesses between 4 mils and 6 mils. In the case of the composition of Examples A and the polyurethane formulation, it was observed that the dye dissipates slowly enough to permit sufficient working life to permit one to complete the coating application task.

TABLE II

COLOR VARIATION DUE TO CONCENTRATION

AT CONSTANT FILM THICKNESS (2 MILS)

| Concentration | 0.001 | 0.002 | 0.003 | 0.004 | 0.005 | 0.006 | 0.007 |
|---|---|---|---|---|---|---|---|
| *DE | 6.80 | 13.80 | 20.42 | 24.83 | 26.42 | 30.48 | 33.91 |

*Average of 3 films, 6 readings (FMCII Ill. D65)

The data presented in Table II and FIG. II was also developed using the method described above. It shows the relationship between colorant concentration and the DE value. The relationship of concentration and film thickness demonstrates that the adjustment of concentration will affect the level of color change at various film thicknesses. This allows adjustment of concentration to improve the visual effect at different film thicknesses. It should be clear that the dissipation of the dye is affected by the following parameters: the type of dye, the concentration, and the film thickness.

Dyes exist that can exhibit color signature for as many as seven days or longer. Others dissipate as quickly as 15 minutes, depending upon the combination of dye, embodiments, concentration of UV, presence of oxidizers or reducers, and the pH of the coating media.

Dyes that have been found to be useful in this invention are:

triarylmethane blue diarylmethane yellow blue indigotene triphenylmethane blue yellow pyrozoine eyrthrosine yellow lake Dye carriers are important for delivering the dye to the coating composition because they facilitate the introduction of the dye into the composition; they can also improve compatibility. Another benefit of a dye carrier is the measuring of tiny amounts of the dye for addition to the clear coating. Typically, the dye is dissolved in the carrier prior to the addition to the coating or other composition (see Example A).

The procedures used for developing the dye and carrier composition that is described in Example A involved the introduction of dye into the methyl amyl ketone and isopropyl alcohol solution and the continuous agitation of this mixture for approximately 10 minutes. The resulting colorant solution was packaged in a polyethylene vial in appropriate volume and placed in an aluminized Mylar bag for protection from light during transport and storage.

While not wishing to be bound by theory, it appears that isopropyl alcohol used with certain dyes will maintain the stability of the dye under normal environmental thermal conditions, when not exposed to UV light.

What is claimed is:

1. A coating composition comprising:
   a coating material; and
   a color-dissipating dye in sufficient quantity to determine by visual inspection a thickness of the coating material when the composition is applied over a colored base.

2. The composition according to claim 1, wherein the coating material comprises a clear coating material.

3. The composition according to claim 1, further comprising carrier solution having a dye carrier.

4. The composition according to claim 3, wherein the dye carrier is selected from a group consisting of: water, glycerin, propylene glycol, sodium benzoate, hydroxyl propyl methylcellulose, and aromatic aliphatic, and oxygenated solvents.

5. The composition according to claim 1, wherein the color-dissipating dye is dissipated in connection with UV light.

6. The composition according to claim 1, wherein the color-dissipating dye is dissipated in connection with a thermal reaction.

7. The composition according to claim 6, wherein the thermal reaction includes a thermal oxidation.

8. The composition according to claim 6, wherein the thermal reaction includes a thermal reduction.

9. A coating composition having properties to facilitate even application of the coating composition, the coating composition comprising:
   at least one clear base polymer; and
   at least one photo chemical reactive dye that provides a temporary translucent property to the coating composition, wherein the reactive dye is provided in sufficient quantity to determine by visual inspection a thickness of the coating composition when the coating composition is applied on a surface.

10. The coating composition according to claim 8, wherein a color associated with the dye dissipates in less than a few days.

11. A coating composition having properties to facilitate even application of the coating composition, the coating composition comprising:
    at least one clear base polymer; and
    at least one thermal reactive dye that provides a temporarily translucent property to the coating composition, wherein the reactive dye is provided in sufficient quantity to determine by visual inspection a thickness of the coating composition when the coating composition is applied over a surface.

12. The coating composition according to claim 11, wherein a color associated with the dye dissipates in less than a few days.

* * * * *

UNITED STATES PATENT AND TRADEMARK OFFICE
CERTIFICATE OF CORRECTION

PATENT NO. : 6,488,719 B2
DATED : December 3, 2002
INVENTOR(S) : Henry Lomasney, Perry Kilpatrick and Shirish Pandit It is certified that error appears in the above-identified patent and that said Letters Patent is hereby corrected as shown below:

<u>Title page,</u>
Item [73], in regard to the name of the Assignee, please delete "Inemec" and insert -- Tnemec --.

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,488,719 B2
DATED         : December 3, 2002
INVENTOR(S)   : Henry Lomasney et al.

It is certified that error appears in the above-identified patent and that said Letters Patent is hereby corrected as shown below:

Title page should be deleted and substitute therefore the attached title page.

Figure 2:
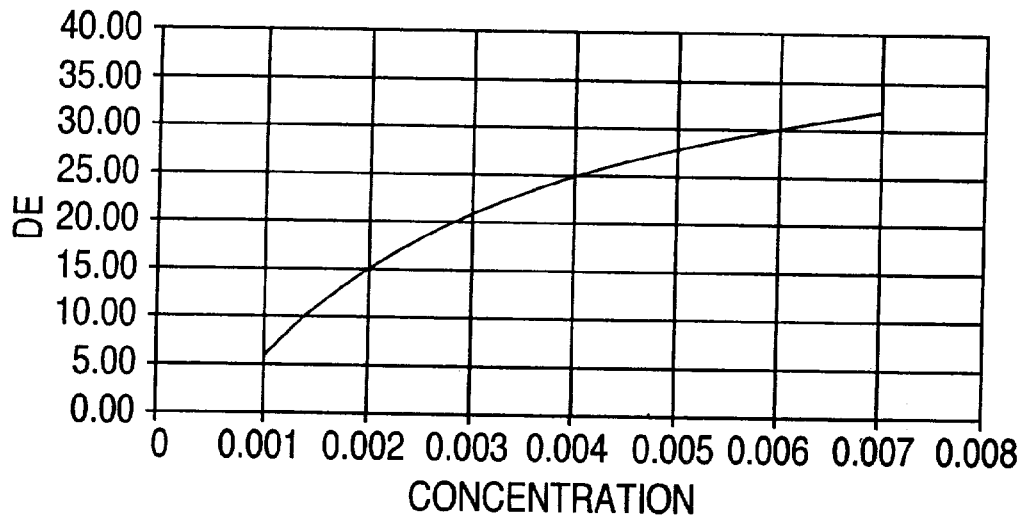

Delete Drawing Sheets 1-2, and substitute therefore the Drawing Sheets consisting of Fig.1 & 2 as shown on the attached pages.

Signed and Sealed this

Twenty-seventh Day of May, 2003

JAMES E. ROGAN
*Director of the United States Patent and Trademark Office*

(12) United States Patent
Lomasney et al.

(10) Patent No.: US 6,488,719 B2
(45) Date of Patent: Dec. 3, 2002

(54) METHOD FOR CONTROLLING WET FILM THICKNESS OF CLEAR COATINGS BY MEANS OF COLOR-DISSIPATING DYE

(75) Inventors: Henry Lomasney, Leawood Kansas, MO (US); Perry Kilpatrick, Kansas City, MO (US); Shirish Pandit, Kansas City, MO (US)

(73) Assignee: Inemec Company, Inc., Kansas City, MO (US)

( * ) Notice: Subject to any disclaimer, the term of this patent is extended or adjusted under 35 U.S.C. 154(b) by 0 days.

(21) Appl. No.: 09/852,152

(22) Filed: May 10, 2001

(65) Prior Publication Data

US 2002/0025371 A1 Feb. 28, 2002

Related U.S. Application Data

(62) Division of application No. 09/469,328, filed on Dec. 22, 1999, now Pat. No. 6,261,631
(60) Provisional application No. 60/113,498, filed on Dec. 22, 1998.

(51) Int. Cl.[7] .................................................. D06P 5/13
(52) U.S. Cl. ........................................ 8/403; 106/31.32
(58) Field of Search ............... 427/9; 8/403; 106/31.01, 106/31.32

(56) References Cited

U.S. PATENT DOCUMENTS

| | | |
|---|---|---|
| 2,320,842 A | 6/1943 | Arnold et al. |
| 2,979,420 A | 4/1961 | Harper |
| 3,372,052 A | 3/1968 | Polniaszek |
| 3,930,063 A | 12/1975 | Miller et al. ............... 427/54 |
| 3,975,554 A | 8/1976 | Kummins et al. ............ 427/8 |
| 4,505,944 A * | 3/1985 | Turner ....................... 106/19 |
| 5,071,440 A | 12/1991 | Hines et al. ................ 8/403 |
| 5,108,460 A | 4/1992 | Hines et al. ................ 8/403 |
| 5,232,494 A | 8/1993 | Miller et al. |
| 5,326,388 A | 7/1994 | Miller et al. |
| 5,548,010 A | 8/1996 | Franer ....................... 524/198 |
| 5,873,909 A * | 2/1999 | Brodmann et al. .......... 8/403 |

FOREIGN PATENT DOCUMENTS

FR   1467175   12/1966

OTHER PUBLICATIONS

BASF Technical Information Bulletin, Entitled "Color Basonyl.RTM.Dyes", Aug. 1987, P. 5, TI/P280.
BASF Corp. Technical Information Bulletin, Entitled "Color Flexo Dyes", Dec. 1986, TI/P2536, pp. 2, 6–9.
Warner–Jenkinson Company, Product Bulletin Entitled "Certified Food Colors", Sep. 1990, pp. 7, 9, 26, 29.
Warner–Jenkinson Company, Product Bulletin Entitled "Certified Food Colors", Jul. 1993, pp. 8–9, 33, 36, 37.
Warner–Jenkinson Company, Product Bulletin Entitled "All About LAKD Pigments", Oct. 1992, pp. 5,9.
BASF Corp. Technical Information Bulletin BCS 1110 Aug.,1990, Entitled "Color Basonyl.RTM.NB Dyes", P. 4 Aug. 1990.

* cited by examiner

*Primary Examiner*—Erma Cameron
(74) *Attorney, Agent, or Firm*—Blackwell Sanders Peper Martin, LLP

(57) ABSTRACT

A method for controlling uniformity of applied film thickness of clear protective coatings by means of a color-dissipatable dye additive which dissipates within a reasonable timeframe, generally from hours to a few days, leaving the applied film with no evidence of its use during the application phase. The color additives temporarily impart color to an otherwise clear coating, and subsequently dissipate over a short period of time. An embodiment of this technology includes the addition of a compatibilizer carrier solution to increase the ease of measuring the dye for addition to the clear coating.

12 Claims, 2 Drawing Sheets

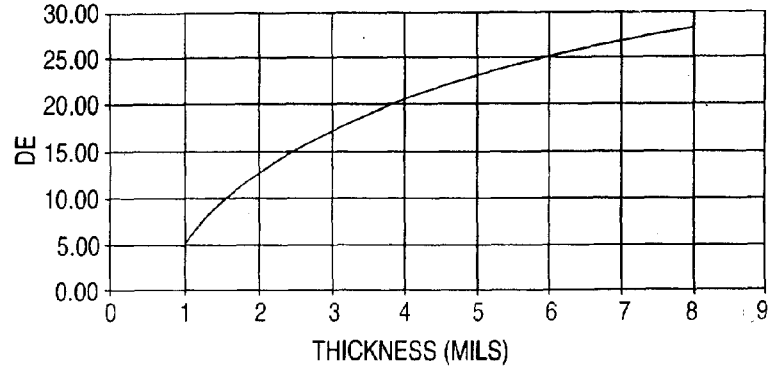

COLOR VARIATION DUE TO FILM THICKNESS

COLOR VARIATION DUE TO FILM THICKNESS

UNITED STATES PATENT AND TRADEMARK OFFICE
CERTIFICATE OF CORRECTION

PATENT NO. : 6,488,719 B2
DATED : December 3, 2002
INVENTOR(S) : Henry Lomasney, Perry Kilpatrick and Shirish Pandit It is certified that error appears in the above-identified patent and that said Letters Patent is hereby corrected as shown below:

Column 6,
Line 36, delete "8" and insert -- 9 --.

Signed and Sealed this

Thirtieth Day of December, 2003

JAMES E. ROGAN
*Director of the United States Patent and Trademark Office*